United States Patent
Zitzmann

(12) 
(10) Patent No.: US 6,617,956 B1
(45) Date of Patent: Sep. 9, 2003

(54) PLATINUM TEMPERATURE SENSOR AND METHOD FOR PRODUCING SAME

(75) Inventor: Heinrich Zitzmann, Lauf an der Pegnitz (DE)

(73) Assignee: Sensotherm Temperatursensorik GmbH, Nürnberg (DE)

( * ) Notice: Subject to any disclaimer, the term of this patent is extended or adjusted under 35 U.S.C. 154(b) by 0 days.

(21) Appl. No.: 09/889,297

(22) PCT Filed: Jan. 12, 2000

(86) PCT No.: PCT/EP00/00179

§ 371 (c)(1),
(2), (4) Date: Aug. 20, 2001

(87) PCT Pub. No.: WO00/42403

PCT Pub. Date: Jul. 20, 2000

(30) Foreign Application Priority Data

Jan. 14, 1999 (DE) .......................... 199 01 183

(51) Int. Cl.⁷ ................................ H01C 7/02
(52) U.S. Cl. ............................ 338/25; 338/28
(58) Field of Search ...................... 338/25, 28

(56) References Cited

U.S. PATENT DOCUMENTS

| | | | | | |
|---|---|---|---|---|---|
| 4,050,052 A | * | 9/1977 | Reichelt et al. | ............. | 338/308 |
| 4,129,848 A | * | 12/1978 | Frank et al. | ................. | 338/308 |
| 4,139,833 A | * | 2/1979 | Kirsch | ........................... | 338/25 |
| 4,952,904 A | * | 8/1990 | Johnson et al. | ................ | 338/36 |
| 5,406,246 A | * | 4/1995 | Friese et al. | .............. | 338/22 R |
| 5,735,606 A | * | 4/1998 | Tani et al. | ................... | 374/185 |
| 5,798,684 A | * | 8/1998 | Endo et al. | ................ | 338/22 R |
| 5,831,512 A | * | 11/1998 | Wienand et al. | .............. | 338/25 |

FOREIGN PATENT DOCUMENTS

| | | |
|---|---|---|
| DE | 43 00 084 C | 7/1995 |
| DE | 195 40 194 C | 2/1997 |
| EP | 0571412 A | 12/1993 |
| WO | WO 87/05146 A | 8/1987 |
| WO | WO 92/15101 A | 9/1992 |

* cited by examiner

*Primary Examiner*—Karl D. Easthom
(74) *Attorney, Agent, or Firm*—Dougherty, Clements & Hofer

(57) ABSTRACT

A platinum temperature sensor comprises a ceramic substrate (4) and a platinum thin-film resistor (2) applied to a main surface of said ceramic substrate. A protective intermediate layer (14, 16) comprises a ceramic layer (14) which, at least in the area of the platinum thin-film resistor (2), is evaporated on the main surface of the ceramic substrate (4) over the full area thereof, and a sintered ceramic paste layer (16) which is applied to the evaporated ceramic layer (14). A protective glaze (18) applied to the protective intermediate layer (14, 16).

4 Claims, 1 Drawing Sheet

PLATINUM TEMPERATURE SENSOR AND METHOD FOR PRODUCING SAME

The present invention relates to a platinum temperature sensor and a method for producing the same, and in particular to a platinum temperature sensor in the case of which a platinum thin-film resistor, which is applied to a ceramic substrate, is used for temperature detection.

Figure 2:
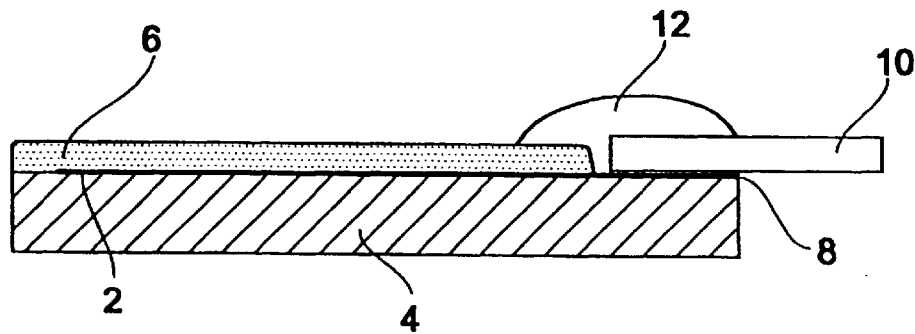

A known platinum temperature sensor is shown in FIG. 2. In this known platinum temperature sensor, a platinum thin-film resistor 2 is applied to a ceramic substrate 4 which normally consists of aluminium oxide $Al_2O_3$. In the area in which the platinum thin-film resistor 2 is formed, a protective glaze 6 is provided on the surface of the ceramic substrate 4. The platinum layer, in which the platinum thin-film resistor 2 is normally formed in a meandering shape, is additionally patterned so as to include connecting areas 8 having lead wires 10 connected thereto in an electrically conductive manner for taking the sensor signal. For fixing the lead wires 10, a glaze 12 is provided.

The field of use of the platinum temperature sensor, which is shown in FIG. 2 and which is implemented in thin-film technology, is normally limited to 600° C. In the last few years, there has, however, been an increasing demand for an embodiment that can be used for higher operating temperatures, which may exceed 1,000° C. In the field of high-temperature sensors considerable efforts have therefore been made to provide platinum temperature sensors which are suitable to be used in such high temperature ranges. By purposefully selecting the composition of the protective glaze 6, it has already been possible to find satisfactory solutions for some cases of use, whereas in very particular fields of application, e.g. in special cases of use in the field of automotive engineering, the results do not satisfy all requirements. For example, the long-term stability of temperature sensors of the type described hereinbefore, especially when they have applied thereto a certain measurement current, which may e.g. be 5 mA, is not sufficiently guaranteed at the high temperatures occurring, viz. temperatures in the range of 800° C. and 1,000° C., since the protective glazes used may be decomposed electrochemically by the necessary measurement current at these high temperatures. The resultant material migration has a negative influence on the properties of the platinum so that the stability of the sensors and, consequently, the measuring accuracy are impaired.

By purposefully selecting the composition of the protective glazes, improvements could be achieved to a certain extent, but it was impossible to find protective glazes that withstand the electrochemical decomposition by the measurement current in the case of continuous loads in a temperature range of 1,000° C. or more than 1,000° C. EP-B-0571412 discloses a high-speed platinum metal temperature sensor in the case of which a passivation layer consists of a ceramic layer and a glass layer. The sequence in which these layers are applied to the platinum metal temperature sensor can be chosen as desired. If the ceramic layer is arranged directly on the temperature sensor and if he glass layer is arranged on top of the ceramic layer, the glass layer will, according to the statements made in EP-B-0571412, penetrate into possibly forming cracks in the ceramic layer at high temperatures. The ceramic layer is applied in thick-film or thin-film technology.

DE 195 40 194 C1 discloses a resistance thermometer in the case of which a platinum resistor is provided on a substrate of magnesium titanate. An intermediate layer is arranged between the platinum resistor and a protective glaze; this intermediate layer has a double-layer structure in the case of which one layer may consist of glass and one layer of ceramics or both layers may consist of ceramics. If the layers consist of ceramics, they are each applied in the form of small ceramic plates having a thickness of 0.1 to 10 mm.

DE 43 00 084 C2 describes a resistance thermometer in the case of which a platinum measuring resistor is arranged on an insulating layer which is attached to a ceramic substrate. A cover layer of silicate glass is arranged between the platinum measuring resistor and a protective glaze.

It is the object of the present invention to provide a platinum temperature sensor which supplies reliable measurement results even in the case of continuous loads in a high temperature range, and a method for producing such a sensor.

This object is achieved by a platinum temperature sensor according to claim 1 and a method according to claim 5.

The present invention provides a platinum temperature sensor comprising a ceramic substrate and a platinum thin-film resistor applied to a main surface of the ceramic substrate. A protective intermediate layer comprises a ceramic layer which, at least in the area of the platinum thin-film resistor, is evaporated on the main surface of the ceramic substrate over the full area thereof, and a sintered ceramic paste layer which is applied to the evaporated ceramic layer. A protective glaze is applied to the protective intermediate layer.

It follows that the present invention permits the advantageous use of a protective glaze so as to achieve excellent sealing of the platinum thin-film resistor from negative environmental influences; other than in the case of known platinum temperature sensors, the protective glaze is, however, not subjected to the electrochemical decomposition caused by the measurement current.

According to the present invention, the above-mentioned problem of the electrochemical decomposition of the protective glaze is avoided in that the platinum resistance path applied to the ceramic substrate, which is preferably an $Al_2O_3$ substrate, and the protective glaze have inserted between them a double layer comprising, on the one hand, an evaporated ceramic layer, which is sufficiently thin to prevent the formation of cracks in this layer even at higher temperatures, and, on the other hand, a ceramic paste layer which is applied to the evaporated ceramic layer. This double layer is sufficiently tight and electrically insulating and consists preferably of $Al_2O_3$ as well. It follows that, according to the present invention, the protective glaze is separated from the current-carrying platinum resistance path in view of the fact that a thin evaporated ceramic layer, in which no cracks will form, is provided below a ceramic paste layer in which cracks may form, if this layer is exposed to high temperatures. Hence, the present invention guarantees that the protective glaze will always be separated from the platinum thin-film resistor, even if the protective glaze penetrates into the ceramic paste layer, so that an electrochemical decomposition of the glaze will be prevented in a reliable manner. This separation of the platinum thin-film resistor and the protective glaze cannot be achieved by simply depositing a thicker ceramic layer by evaporation, since also this thicker ceramic layer would be subjected to crack formation, if it were exposed to continuous loads at high temperatures.

Figure 1:
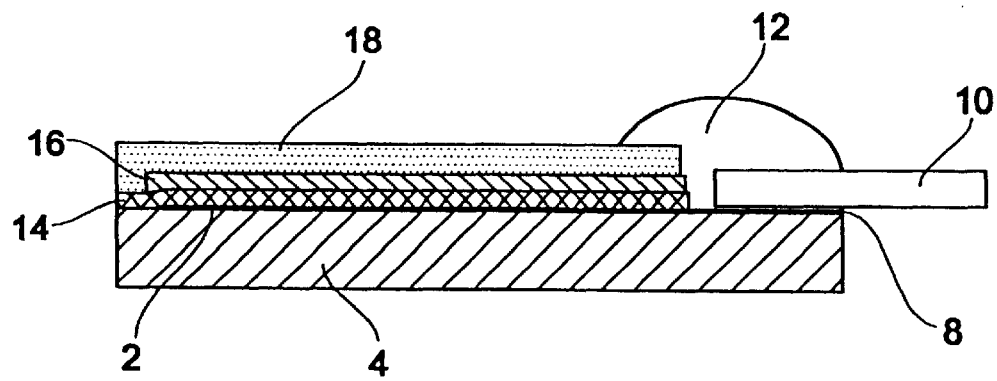

In the following, a preferred embodiment will be explained in detail making reference to the drawings enclosed, in which:

FIG. 1 shows a schematic cross-sectional view of a platinum temperature sensor according to the present invention; and FIG. 2 shows a schematic cross-sectional view of a known platinum temperature sensor.

As can be seen in the embodiment of the present invention shown in FIG. 1, the patterned platinum layer, which is applied to a ceramic substrate 4 and which defines a platinum thin-film resistor 2 as well as connecting areas 8, has evaporated thereon an $Al_2O_3$ layer 14. This layer 14 is evaporated in such a way that it fully covers the platinum thin film resistor 2. On top of the evaporated layer 14 a further layer 16 is arranged, which is formed by a ceramic paste that has been applied e.g. by means of screen printing processes and partially sintered. This layer 16 serves to reinforce the previously evaporated $Al_2O_3$ layer. The layer 16 has then applied thereto a glaze 18 in such a way that the platinum film resistor 2 is sealed from the surroundings in a gastight manner.

For producing the platinum temperature sensor according to the present invention shown in FIG. 1, the $Al_2O_3$ layer 14 is first evaporated onto the surface of the ceramic substrate 4, on which the patterned platinum film layer is arranged, at least in the area of the platinum film resistor 2. Making use of a screen printing process, this layer 14 is then reinforced by a ceramic paste. Subsequently, the ceramic paste is preferably partially sintered. The layer thickness of the evaporated $Al_2O_3$ layer is in a range of from 1 to 3 μm, preferably it is approx. 1.5 μm. The above-mentioned reinforcement of the intermediate layer by means of the ceramic paste to a thickness of approx. 10 to 30 μm is carried out for realizing a reliable sealing also at high temperatures exceeding 800° C. The ceramic paste can consist of a mixture of several ceramic powders and quartz powder, e.g. $Al_2O_3$, MgO, $SiO_2$.

Following this, a glaze coating having a thickness of 30 to 200 μm is applied to the intermediate layer comprising the two sub-layers 14 and 16 in the case of the preferred embodiment. Also this glaze coating is preferably applied by means of a screen printing process. Subsequently, a firing process is carried out preferably at approx. 1,100° C. so as to provide for the platinum thin-film resistor a protective coating which is gas-tight with respect to the ambient atmosphere. The structure shown in FIG. 1 in a schematic cross-section is obtained in this way.

What is claimed is:

1. A platinum temperature sensor comprising:

a ceramic substrate;

a platinum thin-film resistor applied to a main surface of said ceramic substrate;

a protective intermediate layer comprising a ceramic layer which, at least in the area of the platinum thin-film resistor, is vapor deposited on the main surface of the ceramic substrate over the full area thereof, and a sintered ceramic paste layer which to the vapor deposited ceramic layer, said vapour deposited ceramic layer and said sintered ceramic paste layer being formed of the same material; and a protective glaze applied to the protective intermediate layer.

2. A platinum temperature sensor according to claim 1, wherein the ceramic substrate (4) consists of $Al_2O_3$.

3. A platinum temperature sensor according to claim 1 or 2, wherein the evaporated ceramic layer (14) consists of $Al_2O_3$.

4. A platinum temperature sensor according to one of the claims 1 to 3, wherein the sintered ceramic paste layer (16) consists of $Al_2O_3$.

* * * * *